M. BUCH.
VEHICLE BODY DOOR HINGE.
APPLICATION FILED JUNE 27, 1917.
1,279,246.
Patented Sept. 17, 1918.
3 SHEETS—SHEET 1.
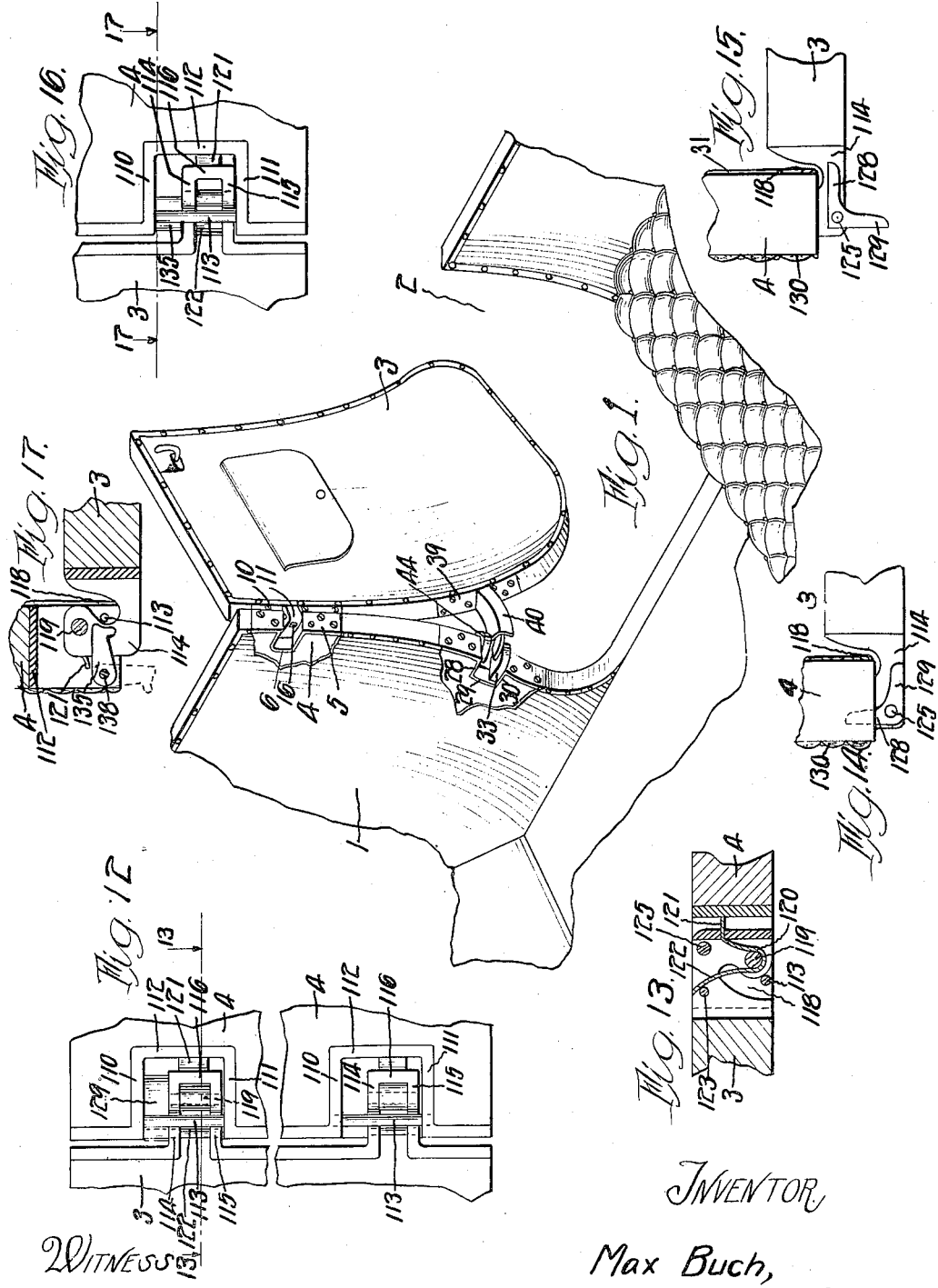
INVENTOR
Max Buch,
ATTORNEYS.

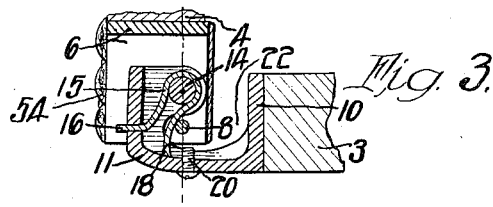
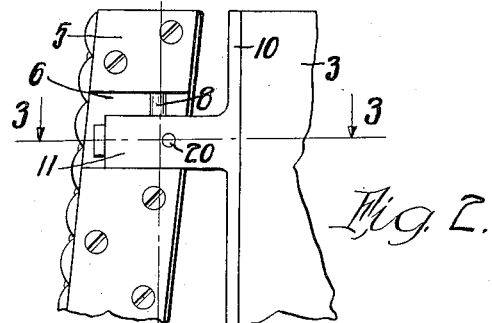
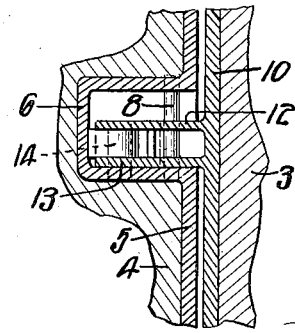
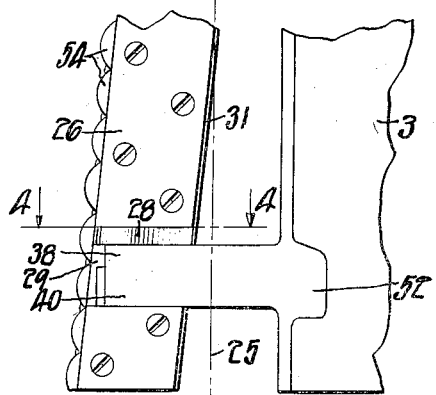
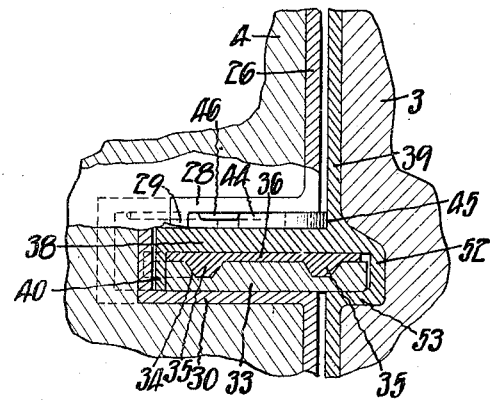
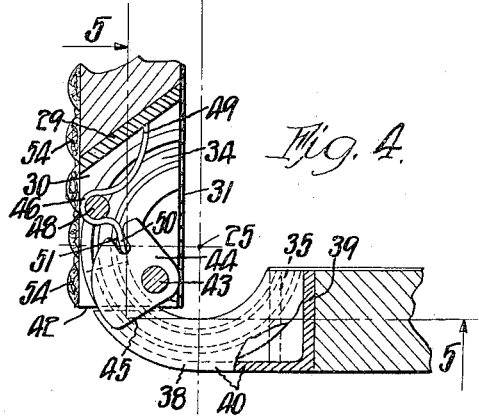
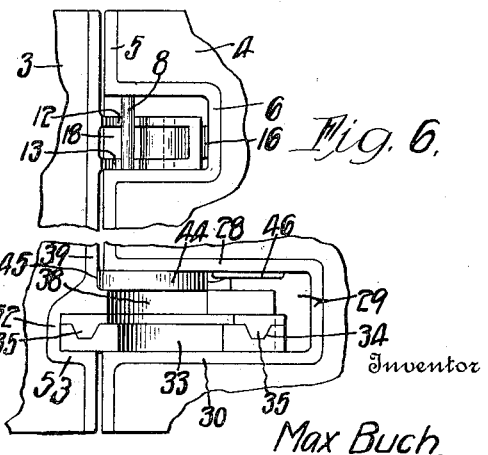

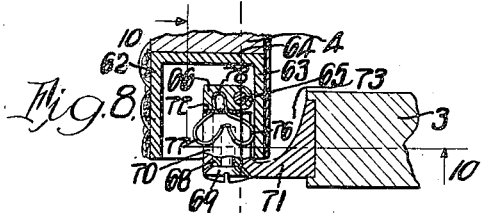
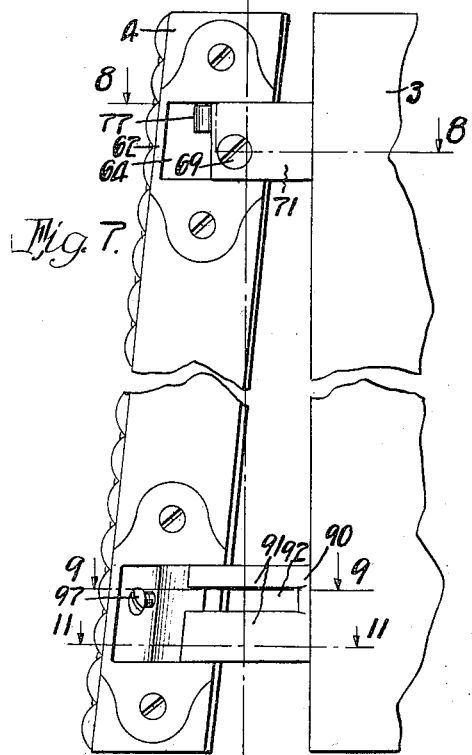
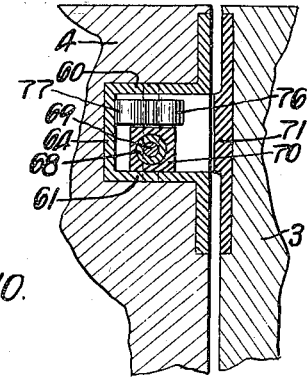
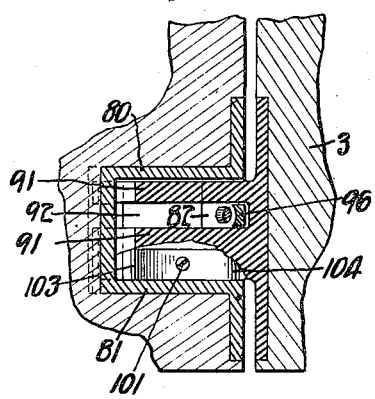
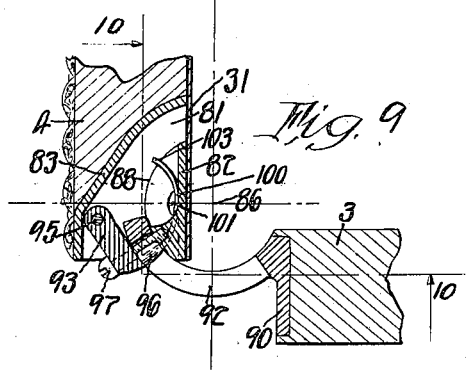
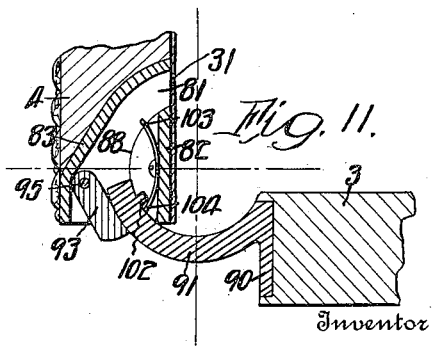

UNITED STATES PATENT OFFICE.

MAX BUCH, OF DETROIT, MICHIGAN, ASSIGNOR TO EDWARDS CORPORATION OF JACKSON, OF JACKSON, MICHIGAN, A CORPORATION OF MICHIGAN.

VEHICLE-BODY DOOR-HINGE.

1,279,246.　　　　　Specification of Letters Patent.　　Patented Sept. 17, 1918.

Application filed June 27, 1917.　Serial No. 177,192.

*To all whom it may concern:*

Be it known that I, MAX BUCH, a subject of the Emperor of Germany, and residing at Detroit, in the county of Wayne and State of Michigan, have invented a new and improved Vehicle-Body Door-Hinge, of which the following is a specification.

The present invention relates to hinges intended primarily for the doors of motor vehicles, although some of its features may be applied advantageously to other doors.

In many vehicles it is desirable to form the body in such manner that its sides bulge or flare upwardly and outwardly; this construction renders the use of ordinary door hinges objectionable since the door, when so mounted, swings about an inclined line and is therefore non-balanced. A balanced door might be secured by locating the lower hinge outside of the body, were it not for the fact that any such construction interferes with the lines of the latter.

To the end of overcoming the objection referred to, the present invention consists in a motor vehicle of the type mentioned in which the axis of the lower door hinge is located outwardly from the face of the body or at least nearer to the outer than to the inner and preferably in a vertical line that includes the axis of the upper hinge, the hinge forming parts being, however, located within the confines of the body.

The invention further consists in means whereby the door is cushioned in the hinge at the limit of its swinging movement in either direction, which both relieves the parts from shocks as the door is swung open and holds the latch snugly against the striker plate when the door is closed, thus preventing rattling. Again, the invention consists in certain means whereby the door is rendered readily detachable from the body, which is of value both in the manufacturing and fitting operations and in that it allows proper ventilation in hot weather; it also consists in the details of construction shown, described and claimed.

In the drawings, Figure 1 is a fragmentary perspective view showing a portion of the body of a motor vehicle in which the invention is embodied. Fig. 2 is an edge elevation of the body at the door opening, the door being swung outwardly thereon. Figs. 3 and 4 are sections on the lines 3—3 and 4—4 of Fig. 2. Fig. 5 is a section on the line 5—5 of Fig. 4, the door being closed. Fig. 6 is a view looking from the outside and showing the hinges, the body metal being removed. Fig. 7 is a view similar to Fig. 2, showing a modification, which is in some respects to be preferred. Figs. 8 and 9 are sections on the lines 8—8 and 9—9 of Fig. 7. Fig. 10 is a broken section on the planes indicated by the lines 10—10 in Figs. 8 and 9. Fig. 11 is a section on the line 11—11 of Fig. 7. Fig. 12 is an outside elevation showing a second modification in which the pivots for both hinges, as well as the axes thereof, are within the outer face of the body. Fig. 13 is a section on the line 13—13 of Fig. 12. Fig. 14 is a plan view corresponding to Fig. 12, the door being open, and the retaining member being in normal position. Fig. 15 is a similar view, the retaining member being swung around to allow the door to be lifted and withdrawn. Fig. 16 is an outside view showing a third modification. Fig. 17 is a section on the line 17—17 of Fig. 16, the door being open.

In the embodiment shown in Figs. 1 to 6, inclusive, 1 indicates the body which flares or bulges outwardly from the bottom and is provided with a door opening 2; the curvature of the door 3 of course corresponds to that of the body. A vertical line passing through the axis of an upper concealed hinge for the door would therefore pass out of the body above the level of the lower hinge, or at least be so close to the outer face of the body at the lower hinge as to render the use of any of the ordinary concealed hinges wherein the pivot bolt is coincident with the pivotal axis impossible.

Various types of upper hinges may be employed in connection with my lower hinge, hereinafter described. In order, however, to secure both the detachability and the cushioning effect above mentioned, I prefer to use the novel form shown. The parts carried by the door post 4 or body comprise the base plate or housing 5, preferably of strap metal, offset into the body at 6 to form a socket the upper and lower walls of which are joined near their outer edges by a pin or abutment 8. This pin might project from one wall only.

Extending into the socket from a plate 10 rigid with the adjacent edge of the door is a hollow projection comprising the inner wall 11 (Figs. 2 and 3) and the upper and lower walls 12 and 13 (Figs. 3 and 5), the two latter being joined by a pin 14 which projects into a hole in the lower wall of the socket formed by the walls 6. The length of the projecting end of the pin is less than the distance between the wall 12 and the upper wall of the socket consequently (it being assumed that the lower hinge does not interfere) the door may be lifted until the pin is withdrawn from the opening and thereafter drawn away from the socket. Mounted in the space between the walls 12 and 13 is a flat spring 15 which passes around the pin 14 and has one end 16 projecting slightly through a slot in the wall 11; the other end 18 tends to spread away from the end 16 and is arranged to engage the abutment 8 as the door aproaches the limit of its opening movement, thus relieving the parts of shock. A stud 20 which may pass through the wall 11 is arranged to engage the end 18 as the door swings shut— at the same time the end 16 of the spring comes into contact with the end wall 6 of the socket, whereby the door is both cushioned in its closing movement and has its latch mechanism resiliently held in engagement with the coöperating latch mechanism (not shown) on the body, as will be readily understood, the result being that the tendency to rattle is overcome. In order to allow proper swinging movement of the door, the walls 12 and 13 are cut away or slotted substantially concentrically with the pin 14, as indicated at 22 (Fig. 3.)

In the lower hinge, the axis of which (as shown at 25, Figs. 2 and 4) is either exterior to the door or so nearly so as to preclude the concealing of an ordinary hinge pivot, the guiding parts are spaced from and arranged concentric with said axis and at one side thereof. The base plate 26 on the door post or body may be separate from but is preferably a continuation of the plate 5, and is bent inwardly at 28, downwardly at 29 and outwardly at 30 to form a socket. The wall 29 is also preferably so inclined (Fig. 4) that the deepest portion of the socket is at the outer face of the body, it being understood that the socket is concealed by the body metal 31 (Fig. 4). Rigid with the plate 26 and resting on the portion 30 thereof is a guide plate 33 in which a groove or track 34 (flaring upwardly) is formed concentric to the axis 25. This groove receives the rib or coöperating track member 35 on the lower side of a member 36 which is itself attached to the lower side of a projection 38 formed integrally with a base plate 39 carried by the door. The last named plate may be a continuation of the plate 10. The projection 38 has a flange 40 depending therefrom along the inner face of the door; this plate extends down to the upper surface of the socket wall 30, thus concealing the track and pivot structure as indicated in Fig. 2.

The end face of the body appears at 42 (Fig. 4). Projecting downwardly from the wall 28 is a pivot or stud 43 upon which a hinge-retaining element 44 is arranged to swing clockwise from the position shown until the edge 45 thereof nearest the door clears the face 42. A spring 46, carried by one end of the stud 48 which also depends from the wall 28, has one of its ends 49 engaging the wall 29, the other end 50 being received in a notch 51 formed in the element 44, from which it follows that said element is normally held in the position shown (Fig. 4) whenever the door is opened; that is, the edge 45 of the element then overlaps the end of the wall 38 and prevents the door from being lifted to allow the rib 35 to be withdrawn from the groove 34. In order to remove the door, it is only necessary, therefore, to press the element 44 inwardly until the proper clearance is secured, whereupon it may be lifted and withdrawn. The element 44 and spring 46 also have another function in that the plate 39 strikes the edge 45 as the door approaches the limit of its closing movement and compresses the spring, thus causing the latter to force the latching mechanism of the door into snug engagement with the coöperating mechanism on the body, whereby rattling is prevented, as above described with reference to the spring 15.

The plate 39 is preferably offset into the door at 52 to allow the use of a track of maximum length; it will also be seen (Fig. 4) that the end of the plate 33 overlaps the lower wall 53 of the offset 52 when the door is closed, which would prevent the door from being lifted at that time regardless of the use of the element 44. In use, the inner faces of the hinge members carried on the door post or body are preferably concealed by upholstering or other covering 54.

Modifications; Figs. 7 to 11, inclusive:— The upper hinge in this instance includes a post-carried housing which may have the upper and lower walls 60 and 61, the inner and outer walls 62 and 63 and the end wall 64. The wall 62 might be omitted and an abutment, similar to the part 8, substituted for the wall 63. Extending across between the walls 60 and 61 is a pivot 65 upon which a block 66 having a cylindrical projection 68 at right angles thereto is carried. The projection is also preferably offset from the axis of the pivot, as indicated in Fig. 8 (in other words, it lies on the inner side of the axis when the door is open), and is threaded to receive a screw 69 whereby a perforated arm 70, that extends laterally from a hinge member 71 fastened to the door, is drawn up against a face or shoulder 72 on the block. The arm 70 is also preferably cut away at 73 to afford clearance past the wall 63. Above the projection 68 on the block, the arm 70 is recessed to receive a flat spring having lobes 76 and 77 projecting from the corresponding sides of the arm and having its central portion 78 seated in a notch in the block 66. When the door approaches the fully open position, the lobe 76 strikes the wall 63 (or the abutment similar to the element 8 above referred to) and absorbs the shock; on the other hand the lobe 77 engages the wall 64 as the door reaches the end of its closing movement and both cushions the parts and thereafter exerts an outward pressure on the door whereby rattling of the latch mechanism is prevented as before. By withdrawing the screw 69 it is evident that the door may be readily pulled off the projection 68 and detached. Other retaining means may, of course, be used.

The body carried housing for the lower hinge comprises the upper and lower walls 80 and 81, the outer wall 82 and the combined inner and end wall 83. The axis 85 of the upper hinge intersects the picture plane at 86 (Figs. 9 and 11). It will be noted that the inner face 88 of the wall 82 is curved substantially concentric to said axis. Projecting from the hinge plate 90 of the door is a hinge member 91 also curved substantially concentric to said axis, said member having a slot 92 for the greater portion of its length. A plate 93 that bears upon the inner face of the member 91 and which, together with the face 88 of the wall 82, forms a guide for said member, is pivoted to swing about a pin 95 which extends between the walls 80 and 81; said plate 93 has a lug 96 which projects into the slot 92 and preferably bears upon the face 88 toward which it is drawn by a screw 97 that passes through the plate 93 and is threaded in the wall 82. Thus the plate 93 does not bind upon the adjacent surface of the member 91. The wall 82 is recessed at 99 opposite the lower portion of the member 91 and receives a spring 100 that is held in place by a screw 101. A lug or pin 102 which projects from the inner surface of the member 91 is arranged to strike the ends 103 and 104 of the spring as the door approaches the limit of its movement in the corresponding directions to cushion the door and to prevent rattle as before.

When the door is to be removed, the screws 69 and 97 are withdrawn. The member 93 may then swing until the lug 96 clears the slot 92, whereupon the door may be pulled off the projection 68 in an obvious manner.

It is preferable in this case, as in the modification first described, to make the housings for the upper and lower hinges integral on account of the divergence of the pivotal axis from the center line of the body.

Modifications; Figs. 12 to 17, inclusive:— Certain features of the invention may be applied to doors in which the axes of the upper and lower hinges are not outside of the body or close to the outer face thereof. In that case the body-supported housings for each of the hinges may include the upper and lower walls 110 and 111 and the end wall 112 and may be formed of a single strip of metal, if desired. The walls 110 and 111 may be joined near one corner by an abutment or stop 113. Projecting from the door are coöperating members which may also be formed of a single piece of metal, each member comprising upper and lower walls 114 and 115 and an end wall 116. The walls 114 and 115 are slotted or notched at 118 (Fig. 13) to clear the abutment 113 and have their end portions nearest the abutment connected by a pivot pin 119 about which passes a U-shaped spring 120. One end 121 of the spring projects through a slot in the wall 116 and has the same function as the end 16 of the spring 15; the other end 122 extends across the notches 118 and bears against an abutment pin 123 carried by the walls 114 and 115 except when the door is fully open—at such times it engages the stop 113 for the purpose of absorbing shock.

The pivot pin 119, as in the case of the pin 14, projects into a hole in the wall 115, and the walls 114 are spaced from the walls 110 a distance greater than the length of the downwardly projecting ends of the pivots 119. In order to prevent the door from accidentally being lifted and disconnected from the body, a pin 125 is passed through the walls 114 and 115 and extended upwardly from the former to form a pivot for a member having the arms 128—129 at substantially right angles to each other. The arm 128 is of a depth substantially equal to the distance between the walls 110 and 114 and normally projects into said space, thus preventing the door from being lifted. When the door is open, however, the member 128—129 may be swung manually to the position shown in Fig. 15, after which the door may be lifted to withdraw the pins 119 from their sockets. The member is automatically swung to door-retaining position as the door closes by the contact of the arm 129 with the upholstering or finishing 130.

The modification shown in Figs. 16 and 17 differs from that last described in that the retaining member 135 is mounted on a stud or projection 138 carried by the wall 110, and is swingable from full line (retaining) position to dashed line (releasing) position, Fig. 17.

The several constructions may be altered in many particulars without departing from the spirit of my invention; therefore I do not wish to be limited except as indicated by the subjoined claims.

I claim:—

1. A vehicle comprising a body having its side bulging outwardly from the bottom and around a door opening formed therein, a door for the opening, upper and lower hinges for the door, the axes of the hinges being alined and being nearer to the outer face than to the inner face of the body at the lower hinge, said lower hinge including a pair of coöperating guiding surfaces curved about the common axis of the hinges, said surfaces being substantially wholly on the inner side of said axis when the door is closed, one of said hinges also including a single means whereby the door is cushioned as it approaches the limits of its swinging movement in both directions.

2. A vehicle comprising a body having its side bulging outwardly from the bottom and around a door opening formed therein, a door for the opening, upper and lower hinges for the door, the axes of the hinges being alined and being nearer to the outer face than to the inner face of the body at the lower hinge, said lower hinge including a pair of coöperating guiding surfaces curved about the common axis of the hinges, said surfaces being substantially wholly on the inner side of said axis when the door is closed, said lower hinge also including resilient means whereby the door is cushioned as it approaches the limits of both its opening and its closing movement.

3. A vehicle comprising a body having its side bulging outwardly from the bottom and around a door opening formed therein, a door for the opening, upper and lower hinges for the door, the axes of the hinges being alined and being nearer to the outer face than to the inner face of the body at the lower hinge, said lower hinge including a pair of members one carried by the door and the other by the body, said members having coöperating guiding surfaces concentric to the common axis of the hinges, and a single resilient element having two contact portions constructed and arranged to be stressed respectively as the door approaches the end of its opening and closing movements.

4. A vehicle comprising a body having its side bulging outwardly from the bottom and around a door opening formed therein, a door for the opening, upper and lower hinges for the door, the axes of the hinges being alined and being nearer to the outer face than to the inner face of the body at the lower hinge, said lower hinge including a pair of members, one carried by the door and the other by the body, said members having coöperating guiding surfaces concentric to the common axis of the hinges, and a single resilient element constructed and arranged to be stressed as the door approaches the limits of both its opening and closing movements.

5. A vehicle comprising a body bulging outwardly from the bottom and around a door opening formed therein, a door for the opening, upper and lower hinges for the door, the axes of the hinges being alined and being nearer to the outer than to the inner face of the body at the lower hinge, said lower hinge including two members having coöperating guiding surfaces, one carried by the body and the other by the door, each being part of the surface of a cylinder concentric with the axis of the hinge, and an element carried by the body and spaced from the cylindrical surface thereon between which and said surface the member on the hinge slides in the swinging movement of the door.

6. A vehicle comprising a body bulging outwardly from the bottom and around a door opening formed therein, a door for the opening, upper and lower hinges for the door, the axes of the hinges being alined and being nearer to the outer than to the inner face of the body at the lower hinge, said lower hinge including two members having coöperating guiding surfaces of revolution about the hinge axis, one carried by the body and the other by the door, and a pivoted member carried by the body and movable toward and from the surface of revolution on said body to form therewith a guide for the member on the door.

7. A hinge construction comprising a member adapted to be secured to a support, a second member adapted to be secured to a swingable closure, the axis of the hinge being outside of both the support and the closure when the latter is closed, said support and said closure including hinge members having coöperating surfaces of revolution about and spaced from said axis, said surfaces being substantially entirely on one side of the axis when the closure is closed, the hinge member carried by the closure being slotted for a portion of its length, and an element passing through said slot and arranged to coöperate with the surface of revolution on said hinge member to guide said hinge member in the swinging movements of the hinge.

8. A hinge construction comprising a member adapted to be secured to a support, a second member adapted to be secured to a swingable closure, the axis of the hinge being outside of both the support and the closure when the latter is closed, said support and said closure including hinge members having coöperating surfaces of revolution about and spaced from said axis, said surfaces being substantially entirely on one side of the axis when the closure is closed, the hinge member carried by the closure being slotted for a portion of its length, an element passing through said slot and arranged to coöperate with the surface of revolution on said hinge member to guide said hinge member in the swinging movements of the hinge, and resilient means forming a part of the hinge whereby the closure is cushioned in its swinging movement in one direction.

9. A hinge construction comprising a member adapted to be secured to a support, a second member adapted to be secured to a swingable closure, the axis of the hinge being outside of both the support and the closure when the latter is closed, said support and said closure including hinge members having coöperating surfaces of revolution about and spaced from said axis, said surfaces being substantially entirely on one side of the axis when the closure is closed, the hinge member carried by the closure being slotted for a portion of its length, and an element passing through said slot and arranged to coöperate with the surface of revolution on said hinge member to guide said hinge member in the swinging movements of the hinge, said element being removable to allow the closure to be detached from the support.

10. A hinge construction comprising a member adapted to be secured to a support, a second member adapted to be secured to a swingable closure, the axis of the hinge being outside of both the support and the closure when the latter is closed, said support and said closure including hinge members having coöperating surfaces of revolution about and spaced from said axis, said surfaces being substantially entirely on one side of the axis when the closure is closed, the hinge member carried by the closure being slotted for a portion of its length, an element passing through said slot and arranged to coöperate with the surface of revolution on said hinge member to guide said hinge member in the swinging movements of the hinge, and a single resilient member forming a part of the hinge whereby the closure is cushioned as it approaches the end of its swinging movement in both directions.

11. A hinge construction comprising a support having a socket, a pivot block mounted therein to swing about an axis near one side of the socket and inwardly a considerable distance from the edge of the support, said block including a projection offset from and at substantially right angles to said axis, a closure, including an element adapted to be slipped over said projection, and means for normally retaining said element on said projection.

12. A hinge construction comprising a support having a socket, a hinge member projecting into said socket and mounted to swing about an axis near one side thereof and inwardly a considerable distance from the edge of the support, a spring carried by said hinge member, said spring being adapted to engage a portion of the wall of the socket to limit and cushion the movement of the hinge member in one direction.

13. A hinge construction comprising a support having a socket, a hinge member projecting into said socket and mounted to swing about an axis near one side thereof and inwardly a considerable distance from the edge of the support, a spring carried by said hinge member, said spring being constructed and arranged to contact with surfaces carried by the support to cushion the swinging movement of the hinge member in both directions.

14. A hinge comprising a pair of coöperating members, one adapted to be secured to a support and the other to a swingable closure, said last mentioned member being adapted to be removed from the first mentioned member by a movement substantially parallel to the axis of the hinge, and a retaining element pivotally mounted on one of the members, whereby the second named member is prevented from being moved parallel to the axis of the hinge.

15. A hinge comprising a socket member secured to a support, a second member projecting into the socket member and of less depth than the distance between the upper and lower walls of the socket member, said second member being adapted to be removed from the socket member by a movement substantially parallel to the axis of the hinge, and a retaining element carried by one of the members and movable at will into the space between the adjacent walls of the two members to prevent such movement of the second member.

16. A hinge comprising a socket member secured to a support, a second member projecting into the socket member and of less depth than the distance between the upper and lower walls of the socket member, said second member being adapted to be removed from the socket member by a movement substantially parallel to the axis of the hinge, and a retaining element pivotally mounted on one of the members to swing about an axis substantially parallel to the axis of the hinge and movable at will into the space between the adjacent walls of the two members to prevent such movement of the second member.

17. A hinge comprising a socket member secured to a support, a second member projecting into the socket member and of less depth than the distance between the upper and lower walls of the socket member, said second member being adapted to be removed from the socket member by a movement substantially parallel to the axis of the hinge, and a retaining element pivotally mounted on one of the members to swing about an axis substantially parallel to the axis of the hinge and movable at will into the space between the adjacent walls of the two members to prevent such movement of the second member, a spring for normally urging the retaining element in one direction, said element being arranged to be swung about its axis and compressed as the hinge is closed.

18. A hinge comprising a socket member secured to a support, a second member projecting into the socket member and of less depth than the distance between the upper and lower walls of the socket member, said second member being adapted to be removed from the socket member by a movement substantially parallel to the axis of the hinge, a retaining element carried by one of the members and movable at will into the space between the adjacent walls of the two members to prevent such movement of the second member, and a spring for normally urging the retaining element in one direction, said element being arranged to be struck by the second member and forced in the opposite direction against said spring as the hinge is closed.

19. A hinge comprising a socket member having an end wall, a second member swingable in the socket, a spring carried by the second member, abutment forming means carried by the socket means, said spring having two arms one of which strikes the end wall of the socket as the hinge approaches the limit of its closing movement, the other member being arranged to strike the abutment forming means as the second member approaches the end of its movement in the opposite direction.

20. A hinge comprising a socket member having two abutment forming means, a second member swingable in the socket, a spring carried by the second member, said spring having two arms, one of the arms being arranged to contact one of the abutment forming means as the hinge approaches the end of its closing movement, the other arm being arranged to strike the second abutment forming means as the hinge approaches the end of its opening movement.

21. A hinge comprising a socket member, a second member swingable in the socket about an axis near one side thereof and some distance from the face of the socket, abutment forming means nearer the face of the socket than said axis, said second member being slotted to clear the abutment forming means as said second member swings, and a spring carried by the second member arranged to be compressed between the second member and the abutment forming means as the hinge approaches the limit of its opening movement.

22. A hinge construction comprising a support having a socket, a pivot block mounted therein to swing about an axis near one side of the socket and inwardly a considerable distance from the edge of the support, said block including a projection offset from and at substantially right angles to said axis, a closure, including an element adapted to be slipped over said projection, means for normally retaining said element on said projection, and a spring carried by the pivot block whereby the movement of the block in one direction is limited and cushioned.

23. A hinge construction comprising a support having a socket, a pivot block mounted therein to swing about an axis near one side of the socket and inwardly a considerable distance from the edge of the support, said block including a projection offset from and at substantially right angles to said axis, a closure, including an element adapted to be slipped over said projection, means for normally retaining said element on said projection, and a spring carried by the pivot block, said spring being constructed and arranged to contact with surfaces carried by the support to cushion the swinging movement of the hinge member in both directions.

24. A vehicle having its side bulging outwardly from the bottom and around a door opening formed therein, a door for said opening, upper and lower hinges for the door, the axis of the hinges being substantially vertical and passing down nearer to the outer face of the body at the lower hinge than at the upper, said hinges including a single metal socket member for both hinges extending unbroken between the upper hinge and the lower hinge.

25. A detachable hinge construction comprising a single socket member for upper and lower hinges, said member being formed of a strip of sheet metal pressed to form two spaced sockets corresponding to said upper and lower members, said hinge construction also comprising a single base plate having projecting elements thereon arranged to enter the sockets, and pivot means for connecting the projecting elements to the walls of the sockets, the depth of the sockets being greater than that of the corresponding projection to allow one member of the hinge to be lifted upwardly to free the pivots and thus permit the parts of the hinge to be detached from one another.

MAX BUCH.